United States Patent

Parker et al.

[11] Patent Number: 6,006,649
[45] Date of Patent: Dec. 28, 1999

[54] DUAL REACTION RATIO POWER BOOSTER

[75] Inventors: Donald Lee Parker, Middletown; Donald Edward Schenk, Vandalia; Gary Chris Fulks, Dayton; Vivek V. Mohile, Beavercreek, all of Ohio

[73] Assignee: General Motors Corporation, Detroit, Mich.

[21] Appl. No.: 09/163,127

[22] Filed: Sep. 29, 1998

[51] Int. Cl.$^6$ ..................................................... F15B 9/10
[52] U.S. Cl. ........................................ 91/369.2; 91/376 R
[58] Field of Search ................................. 91/369.2, 376 R

[56] References Cited

U.S. PATENT DOCUMENTS

| | | | |
|---|---|---|---|
| 3,082,744 | 3/1963 | Gardner | 121/41 |
| 3,910,046 | 10/1975 | Gardner et al. | 60/553 |
| 4,173,172 | 11/1979 | Ohmi | 91/369 A |
| 4,354,353 | 10/1982 | Laue | 91/369.2 X |
| 4,611,526 | 9/1986 | Arino et al. | 91/369.2 |
| 4,905,571 | 3/1990 | DeHoff et al. | 91/373 |
| 5,136,927 | 8/1992 | Rossigno et al. | 91/369.2 |
| 5,146,837 | 9/1992 | Inoue | 91/369.2 |

FOREIGN PATENT DOCUMENTS 0156982  12/1979  Japan ........................ 91/369.2
WO 94/99324  1/1994  WIPO.

Primary Examiner—Hoang Nguyen
Attorney, Agent, or Firm—Robert M. Sigler

[57] ABSTRACT

A power booster is operable at relatively low apply rates and at relatively high apply rates and includes an input assembly that has a movable input rod and a primary reaction piston having a first reaction area. An output support body is responsive to movement of the input rod, with a resilient reaction disc engaging the output support body. A secondary reaction body has a second reaction area and is engageable with the reaction disc and transfers loads between the reaction disc and the input assembly at relatively low apply rates. The amount of the load transferred is a function of both the first reaction area and the second reaction area at the relatively low apply rates resulting in a first reaction ratio. The primary reaction piston is engageable with the reaction disc and transfers loads between the output support body and the input assembly during relatively high apply rates. The amount of the load transferred is solely a function of the first reaction area at the relatively high apply rates resulting in a second reaction ratio that is smaller in magnitude than the first reaction ratio.

12 Claims, 4 Drawing Sheets

DUAL REACTION RATIO POWER BOOSTER

TECHNICAL FIELD

The present invention relates to a dual reaction ratio power booster and more particularly, to a brake power booster for intensifying the brake apply input force between a brake pedal and a master cylinder at different rates depending upon the amount of force that is exerted on the brake pedal.

BACKGROUND OF THE INVENTION

Brake power boosters are known to utilize hydraulic fluid power, pneumatic power or a vacuum and atmospheric pressure differential to provide power assist in applying the brake system's master cylinder. Upon brake application, force on the brake pedal is transferred through the push rod to the power booster, which intensifies the force and transfers it to a type of piston that moves to actuate the master cylinder and apply the brakes. Brake power boosters are known to include a mechanism for transferring the feel of brake operation back from the master cylinder through the power booster to the brake pedal. A typical mechanism includes a reaction body and a reaction disc that are carried in the power piston transmitting forces between the power piston and the piston rod. When the brakes are applied, an apply force is developed to generate fluid pressure at the master cylinder, and that force is offset by being transmitted back through the piston, reaction disc and reaction body. The reaction disc is resilient so that it can be compressed and operates to transfer a portion of the total output force back through a reaction piston, and the pushrod to the brake pedal. This portion of the force, compared to the total force, is the reaction ratio.

With a conventional power booster, the amount of reaction force transferred to the push rod is a straight line function of input force until the unit reaches run-out. This means that regardless of the existing force level, in response to each additional incremental increase of 1 unit of output force from the power booster, an amount equal to x % of that 1 unit of output force is supported by the vehicle's driver at the brake pedal manually. For example, if the reaction ratio of the power booster is 2:1, then 2 units of output force results in 1 units of force being supported by the driver. Likewise, 20 units of output force results in 10 units of force being supported by the driver. To ensure that the input force requirements of a typical system are at an acceptable level over the entire operating range of the unit, the reaction ratio is selected for each individual application. If a harder pedal feel is preferred, then a lower reaction ratio may be selected. If a softer pedal feel is preferred, then a larger reaction ratio may be selected. A drawback is that once the reaction ratio is selected, it is applicable regardless of the actuation conditions that exist during operation of the vehicle's brake apply system.

SUMMARY OF THE INVENTION

It has been determined that vehicle brake apply system applications exist where different reaction ratios are optimal at different operating conditions of a brake apply system. In particular, in some applications, a higher output force is preferably accompanied by a certain reaction force being transferred to the input rod at a ratio of P:1 and a lower output force is preferably accompanied by a lower reaction force being transferred to the input rod through the same booster at a ratio of (P+S):1, where the ratio at the higher output force results in a smaller portion of the total output force being transferred to the driver, than the ratio at the lower output force. Therefore, an aim of the present invention is to provide a power booster that applies one reaction ratio at lower input rates/output forces and applies another reaction ratio at higher input rates/output forces. Preferably a slightly hard pedal is experienced at low application forces and a slightly soft pedal is experienced at high application forces resulting in a non-linear performance curve of input force versus output force. The location of the "kneepoint" on the performance curve, or the change from a hard to a soft pedal, is selected for the given application.

According to a preferred embodiment of the present invention described in greater detail herein, a power booster that is operable at both relatively low apply rates and relatively high apply rates, includes an input assembly that has a movable input rod and a primary reaction piston having a first reaction area. An output body is responsive to movement of the input rod, with a resilient reaction disc engaging the output body. An annular reaction body is positioned adjacent to the reaction disc and transfers a percentage of the reaction force to the booster's power piston. A secondary reaction piston is engageable with the reaction disc and transfers loads between the reaction disc and the input assembly at relatively low apply rates, while transferring loads between the reaction disc and the power piston during relatively high apply rates. The amount of the load transferred is a function of the second reaction area at the relatively low apply rates resulting in a first reaction ratio. The first reaction area is smaller than the second reaction area. The primary reaction piston is engageable with the reaction disc and transfers loads between the output body and the input assembly during all apply rates, but is the sole operator in transferring reaction loads to the input assembly during relatively high apply rates. The amount of the load transferred is a function of the first reaction area at the relatively high apply rates resulting in a second reaction ratio that is smaller in magnitude than the first reaction ratio so that a smaller percentage of the output load is transferred to the input rod during relatively high apply rates than during relatively low apply rates.

According to a preferred aspect of the present invention the secondary reaction piston is captive in-that it is prevented from applying forces that could change the output properties of the booster. This is accomplished by using a uniquely shaped secondary reaction piston that cages a reaction spring. The secondary reaction piston is caged in a manner that allows it to move, compressing the reaction spring in response to the total amount of the reaction force up to a point where it contacts the power piston grounding that portion of the reaction force that is carried by the secondary reaction piston against the power piston. The point at which grounding occurs corresponds to the change between reaction ratios of the booster.

BRIEF DESCRIPTION OF THE DRAWINGS

The present invention will now be described, by way of example, with reference to the accompanying drawings, in which.

DETAILED DESCRIPTION OF THE PRESENTLY PREFERRED EMBODIMENT

Figure 1:
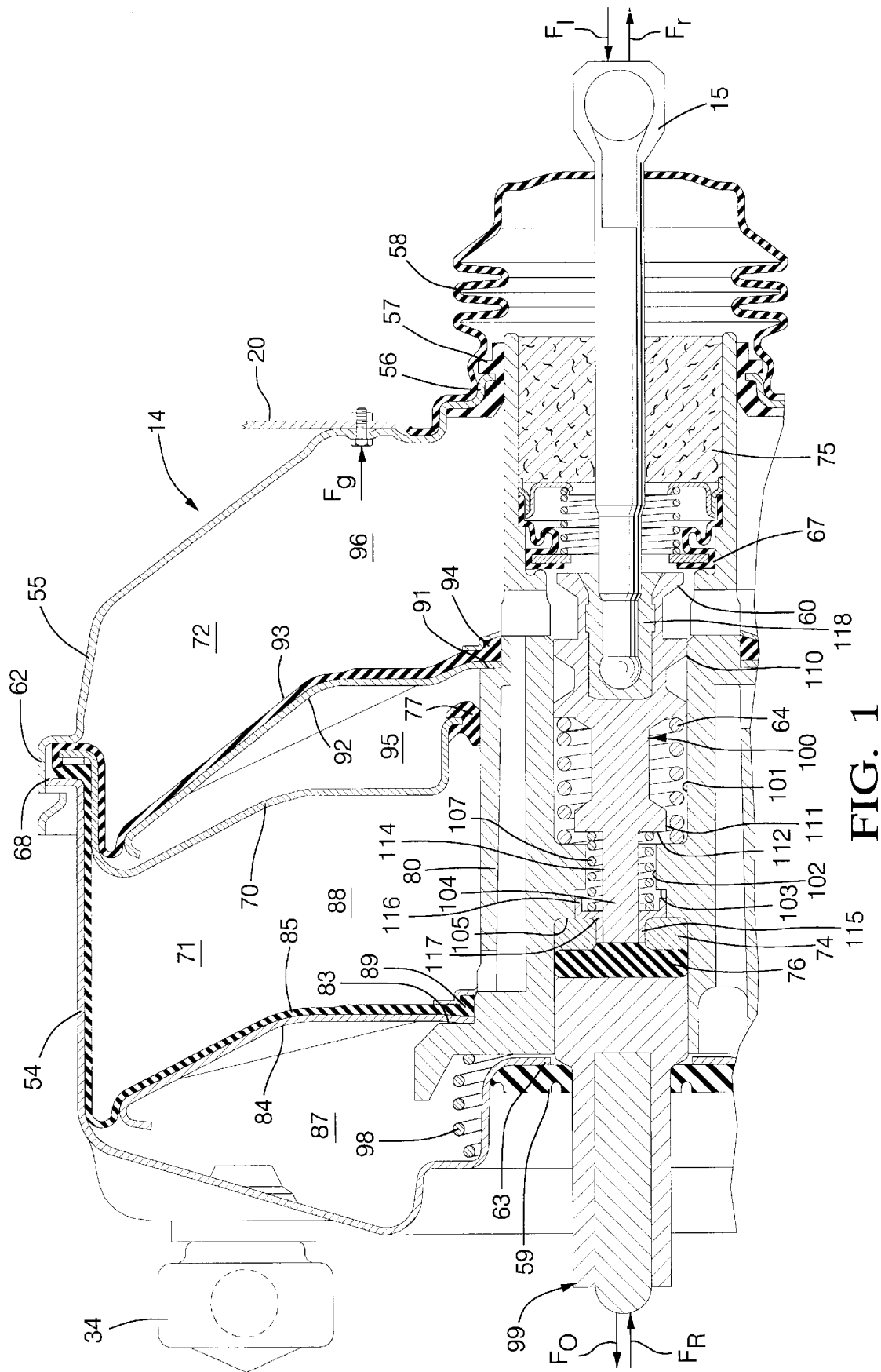
FIG. 1 is a fragmentary cross sectional illustration of a power booster with dual reaction ratio shown in a first mode of operation.

Referring to the drawings, illustrated in FIG. 1 is a brake power booster designated in the aggregate as 14. Power booster 14 is a dual diaphragm vacuum operated booster in this exemplary embodiment utilizing vacuum and atmospheric pressure differentials to boost input forces $F_I$ generating intensified output forces $F_O$. However, the present invention is also applicable to systems with a single diaphragm vacuum booster and with power boosters operation on other power source forms. FIG. 1 illustrates, in cross section, the upper portion the power booster 14 with the remaining unillustrated portion being substantially a mirror image of corresponding sections of the upper portion for purposes of the present discussion. Power booster 14 has a substantially open internal cavity which is formed by mating front housing 54 and rear housing 55. The front and rear housings 54 and 55 are formed from a substantially rigid conventional material such as metal or plastic. Rear housing 55 includes an axially extending flange 62. Axially extending flange 62 mates with outer turned flange 68 of front housing 54 locking the housings 54, 55 together. An inner edge 56 of rear housing 55 carries a seal 57. The end of rear housing 55 is enclosed by boot 58 which is received over the inner edge 56. Another seal 59 seals the area at inner edge 63 of front housing 54. The seal 59 is secured between the rearward end of an associated master cylinder of the type well known in the art, (not illustrated), and the front housing 54.

A housing divider 70 separates the internal cavity into front and rear chambers 71 and 72, respectively. Housing divider 70 includes an outer peripheral flange which is engaged between the front housing 54 and rear housing 55. Housing divider 70 also includes an inner edge which carries an annular seal 77. A power piston 80 extends through annular seals 57 and 77. The power piston 80 is slidable forwardly and rearwardly within the annular seals 57 and 77, with the annual seals 57 and 77 act as bearings for supporting the power piston 80 in the lateral direction.

Power piston 80 includes a rearwardly directed wall 83 against which support plate 84 supports diaphragm 85. Diaphragm 85 includes an integral inner annular seal 89 that engages the power piston 80. Diaphragm 85 separates chamber 71 into control volume 87 and control volume 88. Power piston 80 also includes rearwardly directed wall 91 against which support plate 92 supports diaphragm 93. Diaphragm 93 includes an integral inner annular seal 94 that engages the power piston 80. Diaphragm 93 separates rear chamber 72 into control volume 95 and control volume 96.

The diaphragms 85 and 93, and their respective support plates 84 and 92, are operable such that a vacuum pressure exists in control volumes 87 and 95 which is generated therein through vacuum check valve 34. A variable pressure exists in control volumes 88 and 96 for selectively moving power piston 80 forward in response to pressure differentials created by the introduction of atmospheric air through air valve 60. The variable pressure in control volumes 88 and 96 selectively creates a force on the respective diaphragms 85 and 93. The support plates 84 and 92 apply the force of the diaphragms to the respective rearwardly directed walls 83 and 91 of power piston 80. In response, power piston 80 compresses return spring 98, causing power piston 80 to slide within annular seals 57 and 77 forcing output support body 99 to apply force to the associated master cylinder. The variable pressure in control volumes 88 and 96 is increased through operation of the air valve 60. Air valve 60 is illustrated in the open position separated from its mating component floating control valve 67, which allows atmospheric pressure to enter the control volumes 88 and 96 and thus creates a pressure differential across the diaphragms 85 and 93. The maximum pressure differential between control volumes 87 and 95 on one hand and control volumes 88 and 96 on the other hand, is the difference between generated vacuum and atmospheric. Typically, the vacuum pressure is generated by an internal combustion engine or by another form of air pump.

Atmospheric air entering the power booster 14 travels through filter 75 and the vacuum drawn from the power booster 14 exits through vacuum check valve 34 which is received in the front housing 54. Power piston 80 includes a plurality of air passages through which flow is directed in a conventional manner. When the pressure in control volumes 88 and 96 reaches atmospheric, no further additional pressure differential increase is possible. The power piston 80 transmits power assisted force from the annular wall 105 through the annular reaction body 74 and the reaction disc 76 to the piston-like rod assembly designated as output support body 99 and therethrough, to the master cylinder. The output force $F_o$ is applied the master cylinder by the output support body 99, which is of a two piece construction in the present embodiment, but can also be formed as one piece. The output force $F_O$ results in an equal and opposite opposing force designated as total reaction force $F_R$ that is applied to the output support body 99. The total reaction force $F_R$ is apportioned by the reaction mechanism of the power booster 14 between $F_r$ at the pushrod 15, which is transmitted to the driver, and $F_g$ which is grounded to the supporting structure of the associated vehicle at wall 20 through one or more points.

The power piston 80 includes internal bore 101 which carries the unitary body that serves as the primary reaction piston 100, part of which forms the air valve 60. The primary reaction piston 100 includes a first land section 110 that slidably engages the power piston 80 within internal bore 101. Primary reaction piston 100 also includes a second land section 111 that forms a stop 112, and includes an extension 114 that projects into the annular reaction body 74 and is engageable with the reaction disc 76. Reaction body 74 is positioned in internal bore 101 against annular wall 105. A secondary reaction piston 104 is annular in shape and is positioned around the extension 114 of primary reaction piston 100. An annular leg 115 of secondary reaction piston 104 extends axially along the extension 114 and projects into the annular reaction body 74. Another annular leg 116 extends axially along the power piston 80 within bore 101 near forward facing annular wall 103 of stop 102. The annular legs 115 and 116 are integrally formed as part of the secondary reaction piston 104 with a joining radially directed wall 117 extending between legs 115 and 116. A reaction spring 107 extends between the primary reaction piston 100 at stop 112 and the secondary reaction piston 104 at wall 117, biasing the primary reaction piston away from the output support body 99 and biasing the secondary reaction piston toward the output support body 99. The secondary reaction piston 104 captivates the force of reaction spring 107 so that the output characteristics of the power booster 14 are not influenced by the reaction spring 107.

This is accomplished by transferring the forward directed force of the reaction spring 107 to the power piston 80 by fixing the reaction body 74 in the power piston 80 or by providing a stop (not illustrated), to limit forward movement of the reaction piston 104.

Figure 4:
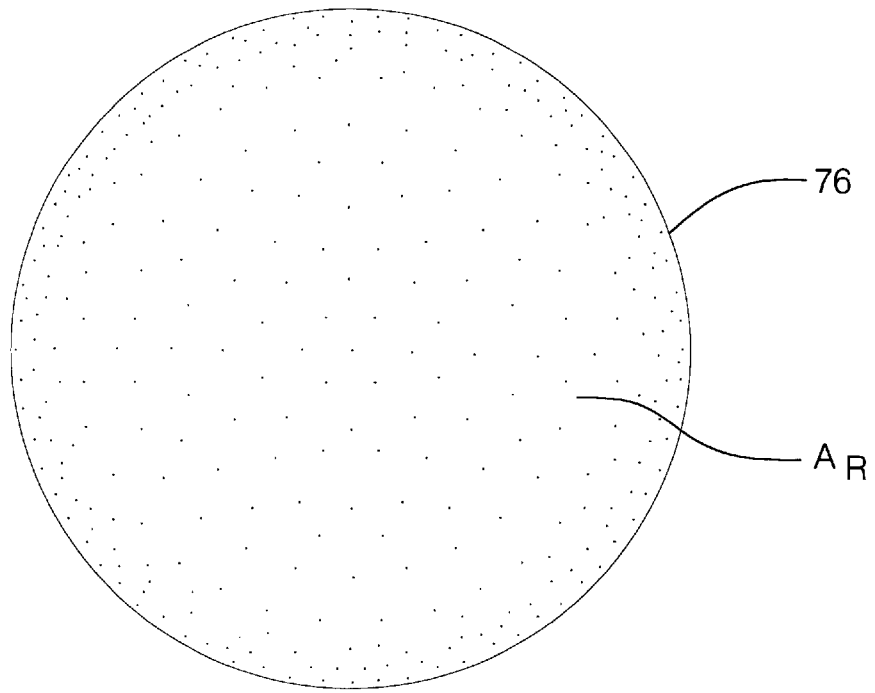
FIG. 4 is a detail illustration of the rearward facing area of the reaction disc of the power booster of FIG. 1.
Figure 5:
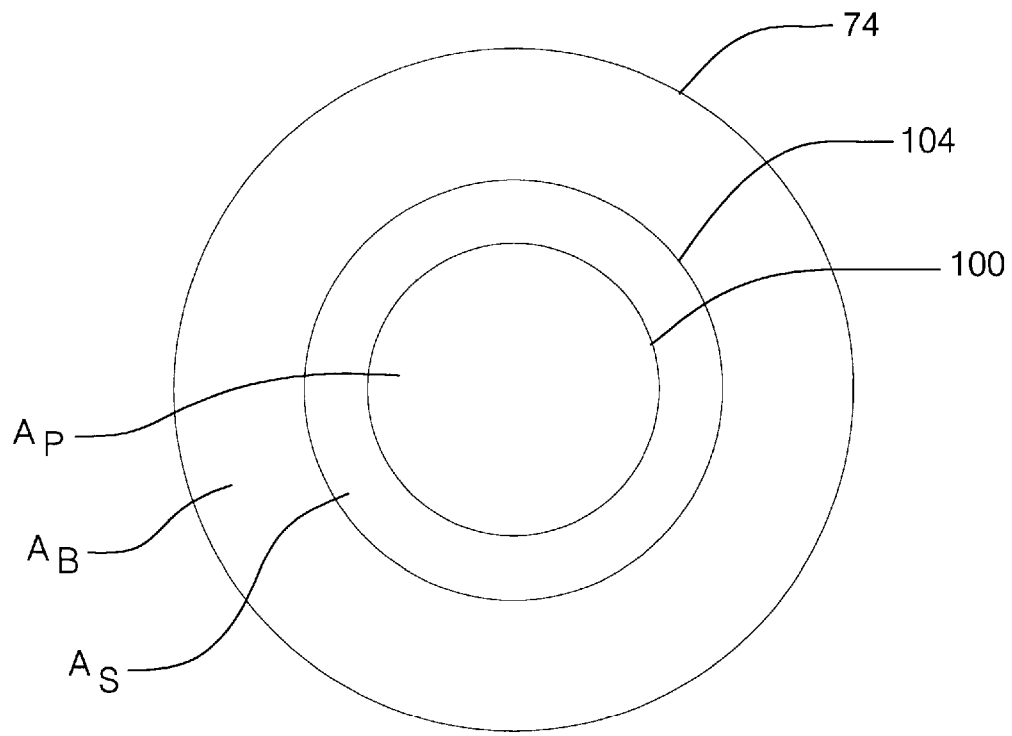
FIG. 5 is a detail illustration of the forward facing area of the annular reaction body, primary reaction piston and secondary reaction piston of the power booster of FIG. 1.

When the brakes are applied at a relatively low apply rate, power booster 14 may become positioned as illustrated in FIG. 1. Feedback in the form of a counteracting total reaction force $F_R$ from the master cylinder (not illustrated), is applied to the output support body 99 and therethrough to the reaction disc 76. The resiliency of the reaction disc 76 permits deformation thereof into the annular reaction body 74 so that engagement is established with the extension 114 of primary reaction piston 100 and with the leg 115 of secondary reaction piston 104. This total reaction force $F_R$ is transmitted back through the reaction disc 76 from the rearward facing area $A_R$ shown in FIG. 4, to the annular reaction body 74 at forward facing area $A_B$ shown in FIG. 5, the primary reaction piston 100 at forward facing area $A_P$ shown in FIG. 5, and the secondary reaction piston 104 at forward facing area $A_S$ shown in FIG. 5. The reaction disc 76 biases the primary reaction piston 100 and the secondary reaction piston 104 rearwardly with a percentage $(F_r)$, of the total reaction force $F_R$ on the reaction disc 76, providing a feedback force through the piston 100 and clip 118 to the push rod 15 and the connected brake pedal (not illustrated). Another percentage $(F_g)$, of the force $F_R$ on the reaction disc 76 is transferred through the annular reaction body 74 to the power piston 80 at wall 105 and is grounded to the vehicle's supporting structure at the wall 20 through the power booster 14. The force transferred from the reaction disc 76 to the secondary reaction piston 104 is transferred through the reaction spring 107 to the primary reaction piston 100, and therethrough to the pushrod 15. Under the relatively low apply rate conditions of FIG. 1, the reaction ratio (referred to as the first reaction ratio), is the ratio of the total rearward facing area of the reaction disc 76, $A_R$, to the forward facing area $A_P$ of the extension 114 that contacts the reaction disc 76 added to the forward facing area $A_S$ of the leg 115 that contacts the reaction disc 76, shown as:

$$\frac{A_R}{A_P + A_S}$$

Figure 2:
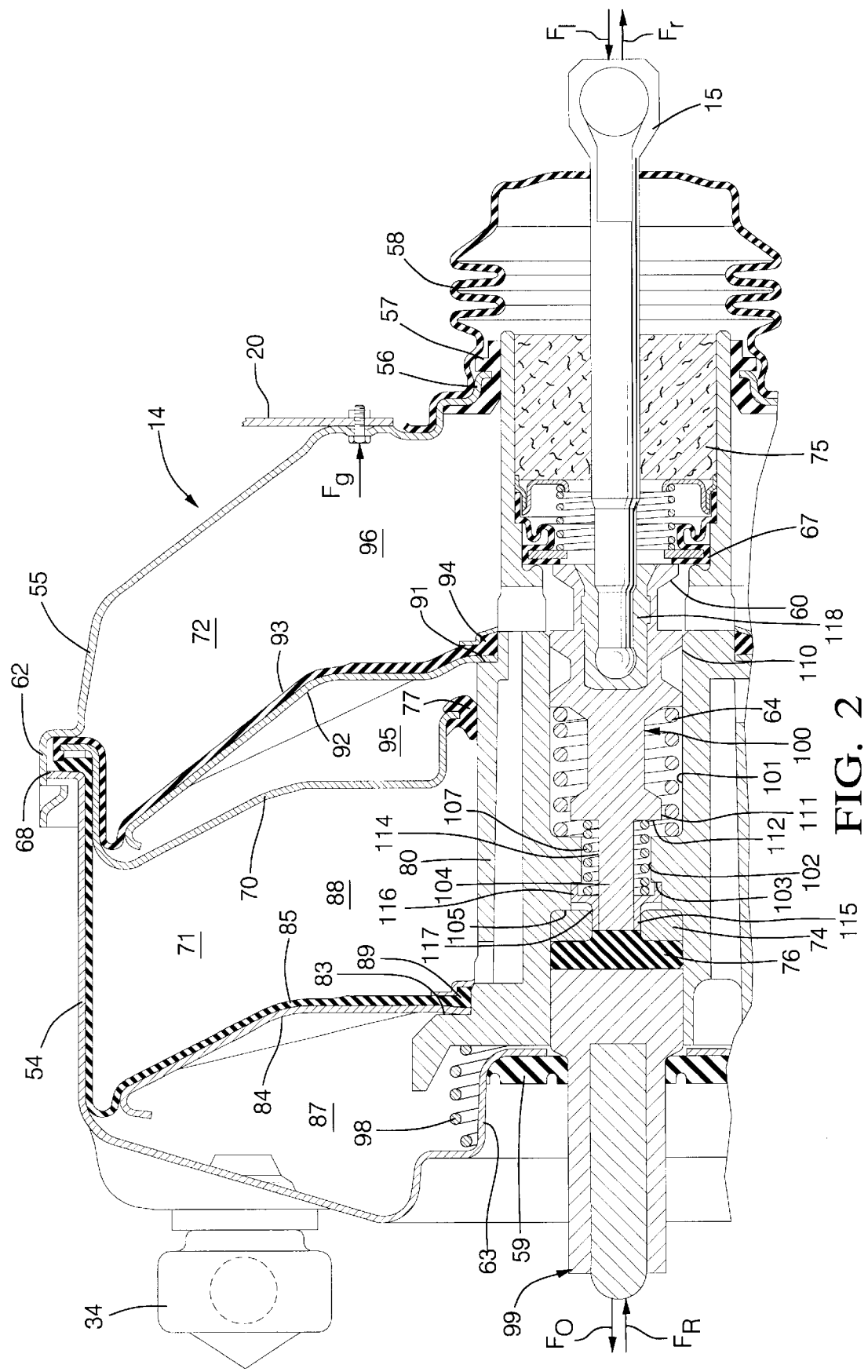
FIG. 2 is a fragmentary cross sectional illustration of the power booster of FIG. 1 shown in a second mode of operation.

When the brakes are applied at a relatively high apply rate, power booster 14 may become positioned as illustrated in FIG. 2. Feedback in the form of counteracting total reaction force $F_R$ from the master cylinder (not illustrated), is applied to the output support body 99 and therethrough to the reaction disc 76. The resiliency of the reaction disc 76 permits deformation thereof into the annular reaction body 74 so that engagement is established with the extension 114 of primary reaction piston 100 and with the leg 115 of secondary reaction piston 104. This total reaction force $F_R$ is transmitted back through the reaction disc 76 to the annular reaction body 74, the primary reaction piston 100 and the secondary reaction piston 104. The reaction disc 76 biases the primary reaction piston 100 rearwardly with a percentage $(F_r)$, of the total reaction force $F_R$ on the reaction disc 76, providing a feedback force through the piston 100 and clip 118 to the push rod 15 and the connected brake pedal (not illustrated). The secondary reaction piston is also biased rearwardly by the force such that the leg 116 engages annular wall 103 of the stop 102 on power piston 80, grounding the force on the secondary reaction piston 74 to the power piston 80 so that it is transferred through the power booster 14 and is carried by the supporting structure of the vehicle at wall 20. Another percentage $(F_g)$, of the force $F_R$ on the reaction disc 76 is transferred through the annular reaction body 74 to the power piston 80 at wall 105 and is grounded to the vehicle's supporting structure at the wall 20 through the power booster 14. Under these conditions, the force transferred from the reaction disc 76 to the secondary reaction piston 104 is not transferred to the pushrod 15. Under the relatively high apply rate conditions of FIG. 2, the reaction ratio is the ratio of the total rearward facing area of the reaction disc 76 to the forward facing area of the extension 114 that contacts the reaction disc. This "second" reaction ratio results from a smaller value in the denominator (the area of the extension 114), and therefore, is a larger number than the first reaction ratio resulting in a smaller percentage of the total force being transferred to the driver.

After brake application, when the push-rod 15 is released, air valve spring 64 forces air valve 60 to close with floating control valve 67 interrupting the flow of atmospheric air into the power booster 14. Vacuum flow out through the vacuum check valve 34 re-equalizes pressure on opposing sides of diaphragms 85 and 93. As the pressure differential is reduced, return spring 98 forces power piston 80 to slide rearwardly and return to an at-rest position.

Figure 3:
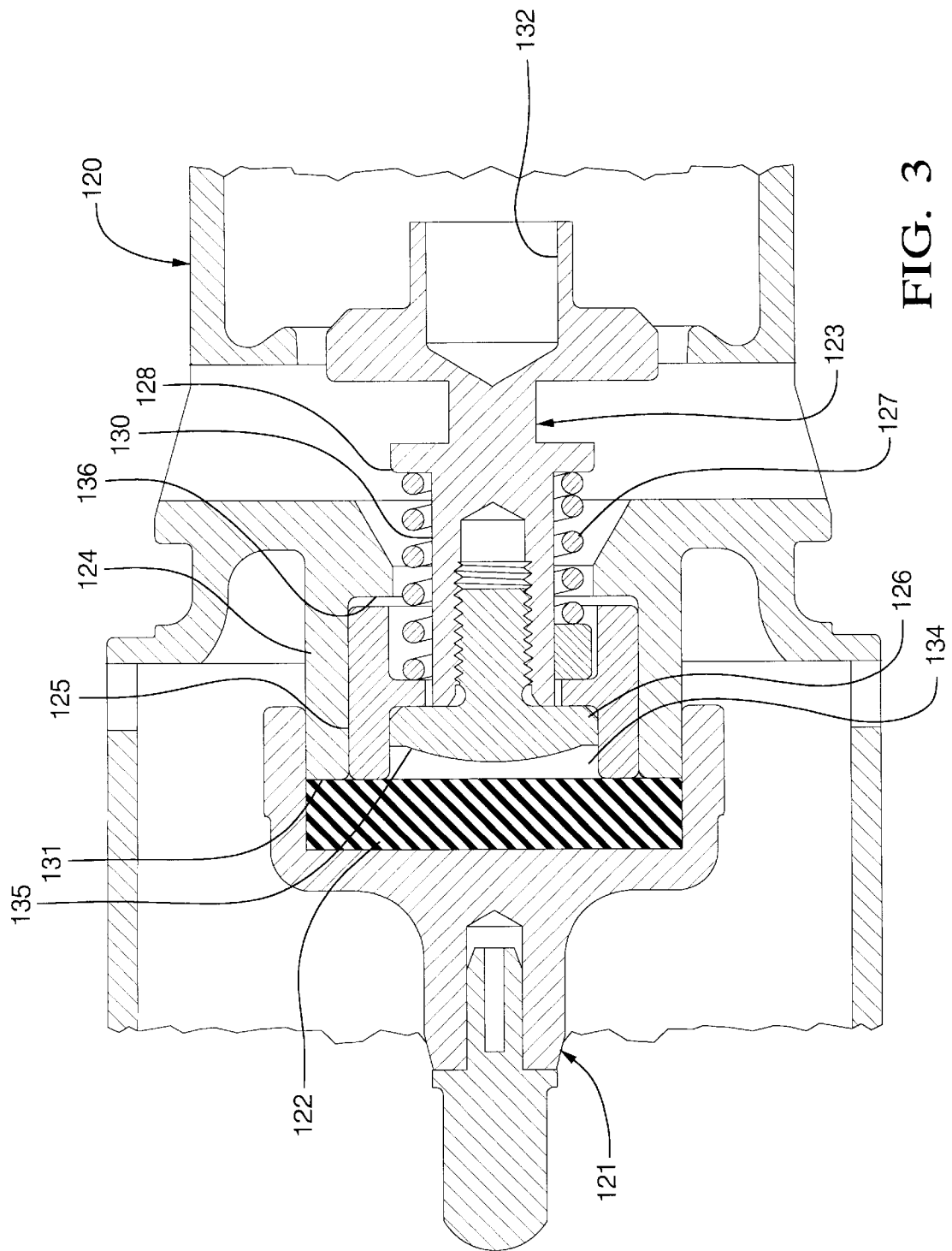
FIG. 3 is a fragmentary cross sectional illustration of a power booster according to an alternative embodiment of the present invention.

Referring to FIG. 3, an alternative embodiment of the present invention is illustrated. The power piston 120 carries an output support body 121 that transfers output forces to an associated master cylinder (not illustrated), and that carries the counteracting reaction force back to the resilient reaction disc 122. The power piston 120 also carries a primary reaction piston 123 and a secondary reaction piston 124. The secondary reaction piston 124 is received within the internal bore of the power piston 120 and includes a tubular body 125 with a radially directed wall 126 extending inwardly from the tubular body 125 near its midpoint. A reaction spring 127 extends between wall 128 of primary reaction piston 123 and wall 126 of secondary reaction piston 124, biasing the primary reaction piston 123 away from the output support body 121 and biasing the secondary reaction piston 124 toward the out support body 121 and against the reaction disc 122. The primary reaction piston 123 is composed of a main body 130 that includes an opening 132 for receiving an input push rod (not illustrated), and an enlarged head 131 that is threaded into an opening of the main body 130 fastening the two pieces together. The enlarged head is biased against the wall 126 by the reaction spring 127.

FIG. 3 shows the power booster in an at-rest condition. When applied at a relatively low rate, the reaction disc is deformed into the void 134 and engages both the enlarged head 131 and the tubular body 125 transferring the reaction force to the primary reaction piston 123 and to the secondary reaction piston 124. The force transferred to the secondary reaction piston 124 is transferred through reaction spring 127 to primary reaction piston 123 so that both loads are transferred to the input push rod. A percentage of the reaction force is transferred to the power piston 120 at the annular reaction body 135 that is formed as part of the power piston 120. During a relatively high apply rate, the secondary reaction piston compresses the reaction spring 127 and engages the wall 136 of power piston 120 grounding the force thereto. Therefore, during a relatively high apply rate the reaction load on the enlarged head 131 is the only load that is transferred through the primary reaction piston to the input rod. Two reaction ratios result from the system, one at relatively low apply rates that results from the forward facing area of the enlarged head 131 and the forward facing area of the tubular body 125 against the reaction disc 122, and one at relatively high apply rates that results solely from the area of the enlarged head 131 against the reaction disc 122.

Accordingly, a power booster is provided through which a higher output force during relatively high apply rates is accompanied by a certain reaction force being transferred to the input rod at a ratio of P:1 and a lower output force is preferably accompanied by a lower reaction force being transferred to the input rod through the same booster at a ratio of (P+S):1, where the ratio at the higher output force is a smaller portion of the total reaction force than the ratio at the lower output force. Therefore, the power booster applies one reaction ratio at lower input rates/output forces and applies another reaction ratio at higher input rates/output forces. Preferably, a slightly hard pedal is experienced at low application forces and a slightly soft pedal is experienced at high application forces resulting in a non-linear performance curve of input force versus output force. The location of the "kneepoint" on the performance curve, or the change from a hard to a soft pedal, is selected for the given application.

What is claimed is:

1. A power booster operable at relatively low apply rates and at relatively high apply rates comprising:

an input assembly including a movable input rod and a primary reaction piston having a first reaction area;

an output support body responsive to movement of the input rod and carrying an output load;

a resilient reaction disc engaging the output support body, the primary reaction piston being engageable with the reaction disc and transferring loads between the reaction disc and the input assembly at the relatively low apply rates and the relatively high apply rates;

a secondary reaction piston having a second reaction area and being engageable with the reaction disc and transferring loads between the reaction disc and the input assembly at the relatively low apply rates wherein the amount of the load transferred is a function of the first reaction area and the second reaction area at the relatively low apply rates resulting in a first reaction ratio, and wherein the amount of the load transferred is a function of the first reaction area at the relatively high apply rates resulting in a second reaction ratio that is larger in magnitude than the first reaction ratio so that a smaller percentage of the output load is transferred to the input rod during the relatively high apply rates than during the relatively low apply rates; and a reaction spring biasing the primary reaction piston away from the output support body and biasing the secondary reaction piston toward the output support body.

2. A power booster according to claim 1 wherein the secondary reaction piston captivates the reaction spring.

3. A power booster comprising:

a housing;

a diaphragm separating the housing into at least two internal chambers;

a power piston having an internal bore and being slidably supported within the housing and extending through the diaphragm and carrying an output support body;

an air valve for admitting atmospheric air into at least one of the internal chambers to induce a force on the diaphragm that is transferred to the power piston applying an output force to the output support body;

an input assembly including a movable input rod and a primary reaction piston having a first reaction area;

a reaction disc formed of a resilient material and carried in the internal bore and engaging the output support body, the primary reaction piston being engageable with the reaction disc transferring loads between the output support body and the input assembly during the relatively low apply rates and the relatively high apply rates;

a secondary reaction piston having a second reaction area and being engageable with the reaction disc and transferring loads between the reaction disc and the input assembly at the relatively low apply rates wherein the amount of the load transferred is a function of the first reaction area and the second reaction area at the relatively low apply rates resulting in a first reaction ratio, and wherein the amount of the load transferred is a function of the first reaction area at the relatively high apply rates resulting in a second reaction ratio that is larger in magnitude than the first reaction ratio so that a smaller percentage of the output load is transferred to the input rod during the relatively high apply rates than during the relatively low apply rates; and a reaction spring biasing the primary reaction piston away from the output support body and biasing the secondary reaction piston toward the output support body.

4. A power booster according to claim 3 wherein the secondary reaction piston captivates the reaction spring.

5. A power booster comprising:

a housing;

a diaphragm separating the housing into at least two internal chambers;

a power piston having an internal bore and being slidably supported within the housing and extending through the diaphragm and carrying an output support body;

an air valve for admitting atmospheric air into at least one of the internal chambers to induce a force on the diaphragm that is transferred to the power piston applying an output force to the output support body, wherein the output force is offset by a reaction force;

an input assembly including a movable input rod and a primary reaction piston having a first reaction area;

a reaction disc formed of a resilient material and carried in the internal bore and engaging the output support body, the primary reaction piston being engageable with the reaction disc transferring loads between the output support body and the input assembly during the relatively low apply rates and the relatively high apply rates;

an annular reaction body positioned adjacent the reaction disc and engaging the power piston and transferring a percentage of the reaction force to the power piston;

a secondary reaction piston having a second reaction area and being engageable with the reaction disc and transferring loads between the reaction disc and the input assembly at the relatively low apply rates wherein the amount of the load transferred is a function of the sum of the first reaction area and the second reaction area at the relatively low apply rates resulting in a first reaction ratio, and wherein the amount of the load transferred is solely a function of the first reaction area at the relatively high apply rates resulting in a second reaction ratio that is larger in magnitude than the first reaction ratio so that a smaller percentage of the output load is transferred to the input rod during the relatively high apply rates than during the relatively low apply rates; and a reaction spring biasing the primary reaction piston away from the output support body and biasing the secondary reaction piston toward the output support body.

6. A power booster according to claim 5 wherein the secondary reaction piston captivates the reaction spring.

7. A power booster according to claim 6 wherein the secondary reaction piston includes an annular leg that extends into the annular reaction body and is engageable with the reaction disc.

8. A power booster according to claim 5 wherein the primary reaction piston includes a main body and an enlarged head that is fastened to the main body, the power booster further comprising a reaction spring that extends between the primary reaction piston and the secondary reaction piston.

9. A power booster according to claim 8 wherein the secondary reaction piston includes a radially directed wall that engages the reaction spring.

10. A power booster according to claim 9 wherein the enlarged head is biased against the radially directed wall by the reaction spring.

11. A power booster according to claim 10 wherein the annular reaction body is formed as one piece with the power piston.

12. A power booster according to claim 11 further comprising an air valve spring biasing the primary reaction piston away from the output support body.

* * * * *